(12) United States Patent
Ganz et al.

(10) Patent No.: US 6,439,658 B1
(45) Date of Patent: Aug. 27, 2002

(54) VENTILATION DEVICE FOR THE SEAT OF A MOTOR VEHICLE

(75) Inventors: Thomas Ganz, Stockdorf; Hans-Georg Rauh, Olching; Stefan Stöwe, Mering, all of (DE)

(73) Assignees: Webasto Systemkomponenten GmbH, Stockdorf; W.E.T. Automotive Systems AG, Odelzhausen, both of (DE)

( * ) Notice: Subject to any disclaimer, the term of this patent is extended or adjusted under 35 U.S.C. 154(b) by 0 days.

(21) Appl. No.: 09/705,943

(22) Filed: Nov. 6, 2000

(30) Foreign Application Priority Data

Nov. 5, 1999 (DE) .......................... 199 53 465

(51) Int. Cl.⁷ .................................. A47C 7/72
(52) U.S. Cl. ................... 297/180.14; 297/217.3
(58) Field of Search .................. 297/217.3, 217.1, 297/180.1, 180.12, 180.13, 180.14

(56) References Cited

U.S. PATENT DOCUMENTS

| 5,479,557 A | * 12/1995 | Ganz et al. |
| 5,545,261 A | * 8/1996 | Ganz et al. |
| 5,934,748 A | * 8/1999 | Faust et al. |
| 6,003,950 A | * 12/1999 | Larsson |

FOREIGN PATENT DOCUMENTS

| DE | 35 40 353 | 5/1987 |
| DE | 197 37 636 | 3/1999 |
| EP | 393437 | * 10/1990 |
| GB | 2300157 | * 10/1996 |

* cited by examiner

Primary Examiner—Milton Nelson, Jr.
(74) Attorney, Agent, or Firm—Nixon Peabody LLP; David S. Safran

(57) ABSTRACT

A ventilation device for the seat (2, 3) of a motor vehicle (1) which has an electrically driven fan (3, 5), the vehicle (1) having a solar cell arrangement (8) which, with the vehicle (1) turned off, provides a supply of solar generated power for operation of the fan (3, 5).

12 Claims, 2 Drawing Sheets

VENTILATION DEVICE FOR THE SEAT OF A MOTOR VEHICLE

BACKGROUND OF THE INVENTION

1. Field of the Invention

The invention relates to a ventilation device for the seat of a motor vehicle which has an electrically driven fan means.

2. Description of Related Art

Equipping motor vehicle seats with a heat-ventilation system which can only be operated via the vehicle electrical system with the ignition on is known, Published German Patent Application DE 197 37 636 A1 describes a climate-controlled seat which has an air channel which runs roughly vertically in the middle zone of its backrest. A blower driven by an electric motor is located in the air channel near a top air outlet. Power is supplied to the electric motor via the motor vehicle battery.

Furthermore, published German Patent Application DE 35 40 353 A1 discloses operating a fan for ventilation and fresh air supply of the motor vehicle interior even with the ignition off by means of solar cells attached to the motor vehicle. With the motor vehicle turned off, heating of the seat, and especially of the body contact surfaces of dark leather seats caused by incident solar radiation, cannot be counteracted to the required degree or at all with the known devices.

SUMMARY OF THE INVENTION

Therefore, the primary object of the present invention is to devise a ventilation device for a motor vehicle seat which enables ventilation of the seat, and thus a reduction of the temperature of the body contact surfaces of the seat, even with the motor vehicle turned off.

This object is achieved in accordance with the invention in the initially mentioned ventilation device by the motor vehicle having a solar cell arrangement which, with the vehicle turned off, makes available solar power supply for operating the fan. Thus, seat ventilation can take place which allows reduction of the seat temperature to the interior temperature even with the engine off and ignition interrupted, and thus, independent of the motor vehicle electrical system. The solar power supply provides the required energy when the incident solar radiation leads to heating of the seats. The motor vehicle battery is not burdened.

In one feasible embodiment, there is at least one electrically operated ventilator or a blower for producing an air flow in the seat, the air flow being routed from the seat interior to the seat surface and/or the seat back and emerging via at least one opening of the seat or via an air-permeable area of the seat. By means of the blower, ventilator or fan contained in the seat, no special ventilation channels are necessary for supplying an air flow from a blower located outside the seat to the seat. By blowing onto the inside or bottom of the seat and/or back surfaces and the emergence of the air flow through openings or perforations formed therein, effective ventilation with temperature reduction of the corresponding seat or body contact surfaces of the seat is achieved. Cooling of the ventilation air by an air conditioning or climate-control system is unnecessary. The number and the output of the ventilators or the blower in the seat and/or the back are fixed depending on the required cooling or ventilation performance and the installation conditions.

Preferably, there is a control means which controls the solar power supply from the solar cell arrangement to the fan means or the ventilator or the blower. The control means can control the power supply individually, and as necessary, so that excess current can be used, for example, to charge the battery. The control means can activate the power supply especially with the ignition off, but can also turn it on with the engine running so that seat ventilation can be operated also when driving via the solar power supply.

In one preferred embodiment, the control means controls the solar power supply of the ventilator depending on the seat temperature and especially the surface temperature of the seat surface and/or the seat back.

Feasibly, it can be provided that the control means controls the solar power supply of the ventilator alternatively or in addition to temperature control depending on the sunlight incident on the seat, especially on the seat surface and/or the seat back.

Preferably, at least one sensor is associated with the seat and is connected to the control means, the sensor acquiring the control quantity of the control means. The sensor can be located on or in the seat or seat back or also spaced away from the seat for proximity measurement. For the described control, the sensor can be a temperature sensor or a light sensor, but sensors based on other measurement principles can also be used to control the seat ventilation.

When the solar power supply to at least one ventilator can be turned off by a manually operated switching means, for example, in winter, the ventilation can be shut off if heating of the seat by incident solar radiation should be desirable.

Preferably, the solar power supply additionally drives a motor vehicle blower for fresh air feed into the motor vehicle. Via the control means, the energy of the solar cells which is not needed by the seat ventilation means can be sent to this vehicle blower.

In one preferred embodiment, there are two ventilators under the seat surface and behind the seat back there is one ventilator. However, as mentioned above, other combinations are also possible, if necessary.

Preferably, the ventilator is a radial fan which works with good efficiency, but can also be an axial fan.

In the following, one embodiment of the invention is explained with reference to the accompanying drawings.

DETAILED DESCRIPTION OF THE INVENTION

Figure 1:
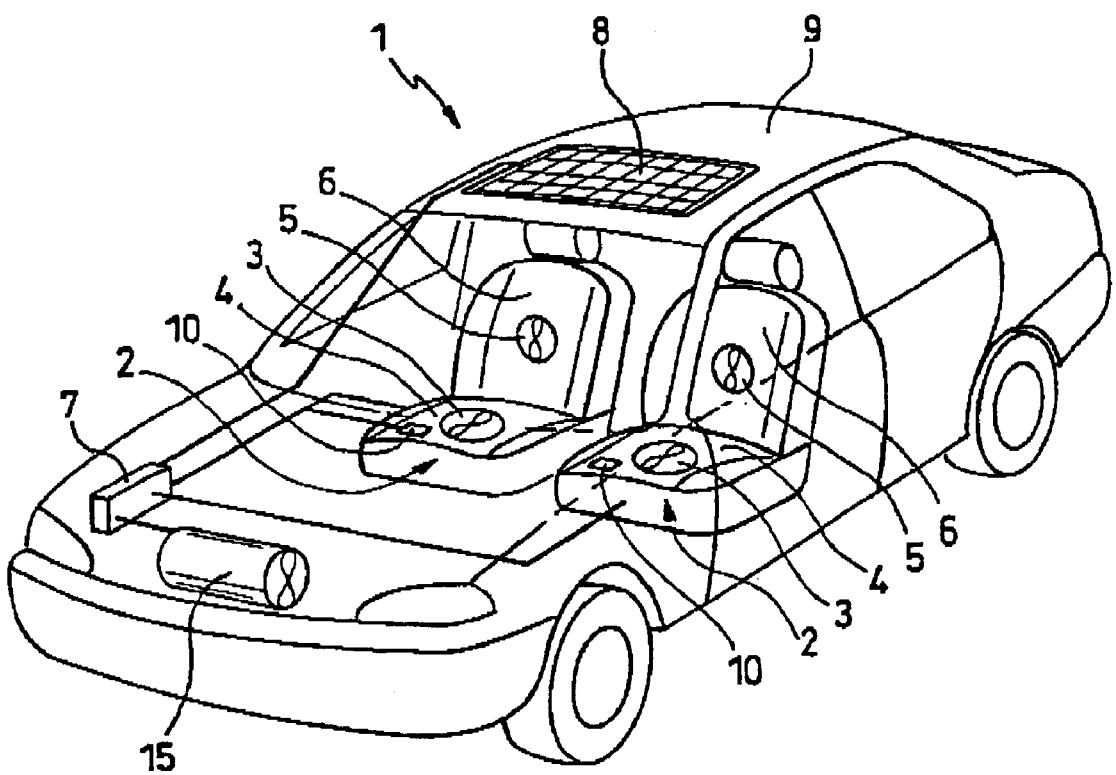
FIG. 1 is a perspective view, in schematic form, a motor vehicle with a ventilation device for the motor vehicle seat.

A motor vehicle 1, especially a passenger car, contains two front seats 2 in each of which there is a fan or ventilator 3 within the seat underneath the seat surface 4 and a ventilator 5 in the seat back 6. Each rotating ventilator 3, 5 blows an air flow from the seat interior against the seat surface 4 or the seat back 6 which are preferably made of leather and which have perforations for discharge of the air flow; but, a seat with a fabric coating of a large-pore, air-permeable material can also be used.

The ventilators 3, 5 are connected to a control means 7 which supplies power for the ventilators 3, 5 from a solar cell arrangement 8 which, for example, is attached on the motor vehicle roof 9 or is formed as a solar roof with an integrated solar module which has, for example, 28 solar cells. However, the solar cells 8 can also be attached or integrated on other body parts, for example, on the trunk lid, especially, when used on a convertible.

The control means 7 is connected to at least one sensor 10 for acquiring a control parameter. The control parameter is, for example, the seat temperature on the seat surface 4 or the seat back 6 and especially its surface temperature. To acquire this temperature, accordingly, there is a temperature sensor in or on the seat 2 or a temperature sensor in the motor vehicle 1 which measures the temperature in proximity to the seat. These temperature sensors can be provided both for the seat surface 4 and also for the seat back 6 for each of the ventilators 3, 5 and for controlling the respective power supply.

Alternatively, or in addition to at least one temperature sensor, a light sensor can be connected to the control means 7 and acquires the incidence of sunlight and especially direct solar irradiation of the seat surface 4 or the seat back 6. One such light sensor is, for example, a photocell which is attached or integrated in the area of the seat surface 4 or the seat back 6.

Figure 2:
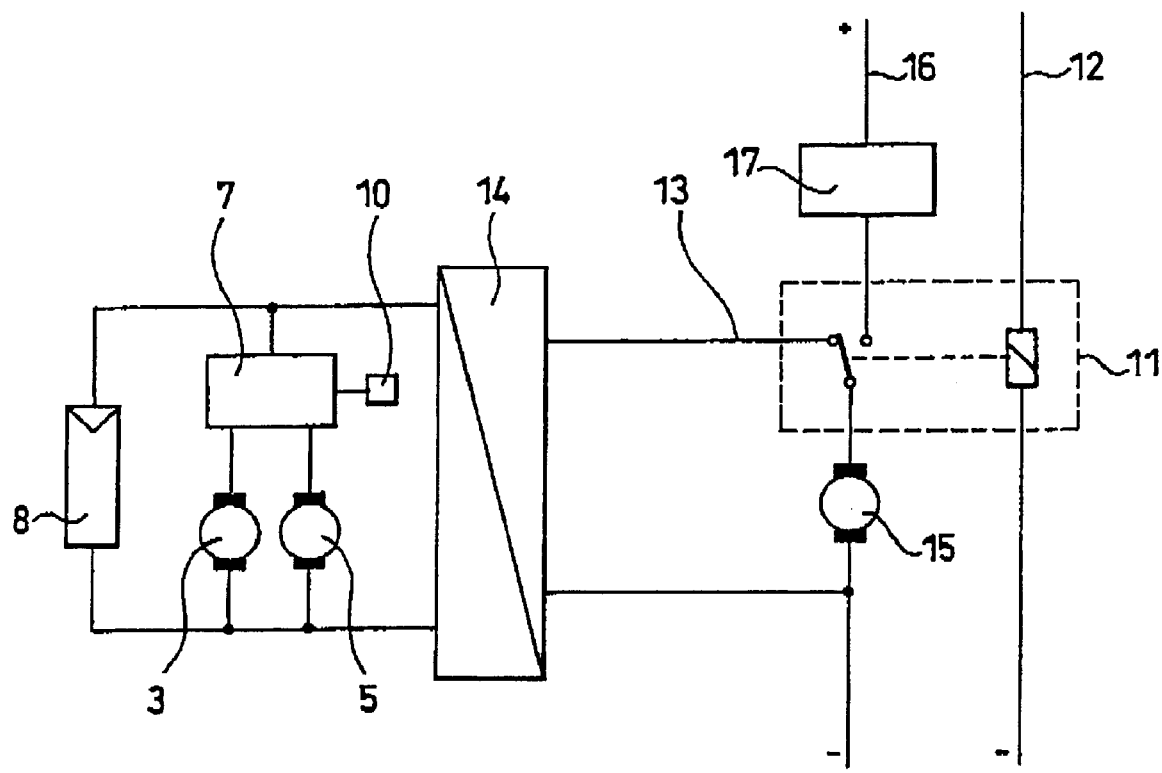
FIG. 2 is a a circuit diagram of the ventilation device.

In the circuit of the ventilation device shown in FIG. 2, a relay 11 which is connected via a line 12 to the engine ignition of the motor vehicle, with the ignition off, has switched a break contact circuit 13 so that current from the solar cells 8 can flow via a dc voltage converter 14, which keeps the voltage constant, to a motor vehicle blower motor 15 which blows fresh air into the motor vehicle. As soon as a sufficient voltage is made available by the solar cells 8, the motor vehicle blower motor 15 runs.

Depending on at least one control parameter which is acquired via at least one sensor 10, a variable control portion of the electric power produced by the solar cells 8 is delivered to the ventilators 3, 5 by the control means 7. Thus, when the position of the sun is low, when the sun is radiating intensively onto the seat back 6, and thus, the incident radiation is acquired, for example, with the light sensor 10 or solarimeter, the assigned ventilator 5 is supplied with power to the required degree in order to achieve the desired temperature reduction by the circulating air flow. If, due to the changing position of the sun, there is no longer direct incident solar radiation onto the seat, the energy produced by the solar cells 8 can be used for ventilation of the motor vehicle interior via the motor vehicle blower motor 15 instead of for seat ventilation.

By controlled adjustment of each seat 2 of the motor vehicle, the varied incident solar radiation can be considered in seat ventilation, and also the back seats in a passenger car, the seats of a truck or any other vehicle or the seats of a bus can be ventilated individually or also in a group connection.

With the ignition on (power through the line 12), the relay 11 switches the connection between the line 16 of the vehicle electrical system and the motor vehicle blower motor 15 so that the latter is separated from the circuit of the solar cells. By means of a blower controller 17, which is connected in between to the line 16 and which can be part of a climate-control system, the rpm of the vehicle blower motor 15 can be adjusted, for example, by preselection of a blower stage.

What is claimed is:

1. Motor vehicle seat ventilation arrangement comprising an electrically driven fan in at least one vehicle seat, and a solar cell arrangement for supplying electrical power to the fan of the at least one vehicle seat independent of a vehicle engine electrical system; further comprising a temperature sensor positioned close to a seating surface of a seat part of the at least one vehicle seat and control means connected to said temperature sensor for controlling the supply of electrical power from the solar cell arrangement to the fan as a function of seat temperature sensed by said temperature sensor.

2. Motor vehicle seat ventilation arrangement as claimed in claim 1, wherein the air flow from the fan is routed from the seat interior via an air-permeable surface area of the seat.

3. Motor vehicle seat ventilation arrangement as claimed in claim 1, wherein a manually operated switch is provided for turning off the supply of electrical power to the at least one fan.

4. Motor vehicle seat ventilation arrangement as claimed in claim 1, wherein the control means is operative for activating the electrical power supply to the fan with the vehicle engine turned off.

5. Motor vehicle seat ventilation arrangement as claimed in claim 1, wherein there are two fans under a seat bottom surface and one fan behind a seat back surface.

6. Motor vehicle seat ventilation arrangement as claimed in claim 1, wherein at least one temperature sensor is associated with the at least one seat and is connected to the control means.

7. Motor vehicle seat ventilation arrangement as claimed in claim 1, wherein the control means is operative for controlling electrical power supply to the fan as a function of the incidence of sunlight on the seat in an unoccupied condition.

8. Motor vehicle seat ventilation arrangement as claimed in claim 1, wherein the at least one fan is one of a radial fan and an axial fan.

9. Motor vehicle seat ventilation arrangement comprising an electrically driven fan in at least one vehicle seat, a solar cell arrangement for supplying electrical power to the fan of the at least one vehicle seat independent of a vehicle engine, and a control means for controlling the supply of electrical power from the solar cell arrangement to the fan; wherein the control means is operative for controlling electrical power supply to the fan as a function of the incidence of sunlight on the seat; and wherein at least one light sensor is associated with the at least one seat and is connected to the control means.

10. Motor vehicle seat ventilation arrangement comprising an electrically driven fan in at least one vehicle seat, and a solar cell arrangement for supplying electrical power to the fan of the at least one vehicle seat independent of a vehicle engine; wherein the solar cell arrangement is also connected to a motor vehicle blower for providing a fresh air feed into the vehicle; and wherein a control is provided for connecting the motor vehicle blower to the solar cell arrangement when a vehicle ignition is off and for disconnecting the motor vehicle blower from the solar cell arrangement when the vehicle ignition is turned on.

11. Motor vehicle seat ventilation arrangement comprising an electrically driven fan in at least one vehicle seat, and a solar cell arrangement for supplying electrical power to the fan of the at least one vehicle seat independent of a vehicle engine; wherein the solar cell arrangement is also connected to a motor vehicle blower for providing a fresh air feed into the vehicle; and wherein a control is provided which apportions the electric power from the solar cell arrangement between the fan and the motor vehicle blower.

12. Motor vehicle seat ventilation arrangement according to claim 11, wherein said control is also operative for connecting the motor vehicle blower to the solar cell arrangement when a vehicle ignition is off and for disconnecting the motor vehicle blower from the solar cell arrangement when the vehicle ignition is turned on.

\* \* \* \* \*